(12) United States Patent
LeCavalier et al.

(10) Patent No.: US 7,913,649 B2
(45) Date of Patent: Mar. 29, 2011

(54) LITTER BOX SAFETY GUARD

(76) Inventors: Katherine LeCavalier, Rutherfordton, NC (US); Robin LeCavalier, Rutherfordton, NC (US)

( * ) Notice: Subject to any disclaimer, the term of this patent is extended or adjusted under 35 U.S.C. 154(b) by 573 days.

(21) Appl. No.: 11/972,911

(22) Filed: Jan. 11, 2008

(65) Prior Publication Data

US 2008/0105209 A1 May 8, 2008

Related U.S. Application Data

(63) Continuation-in-part of application No. 11/327,186, filed on Jan. 7, 2006, now abandoned.

(60) Provisional application No. 60/642,258, filed on Jan. 8, 2005.

(51) Int. Cl.
*A01K 1/01* (2006.01)

(52) U.S. Cl. ........................ 119/165; 119/166

(58) Field of Classification Search .............. 119/165, 119/166, 167, 168, 169, 170; 49/50, 57, 49/58; 296/152
See application file for complete search history.

(56) References Cited

U.S. PATENT DOCUMENTS

| | | | | |
|---|---|---|---|---|
| 2,277,494 A * | 3/1942 | Loewenstein | ................ | 248/459 |
| D228,998 S * | 11/1973 | Rozman | ................ | D6/310 |
| 3,885,523 A * | 5/1975 | Coleman | ................ | 119/165 |
| 3,990,669 A * | 11/1976 | Smith | ................ | 248/459 |
| 4,760,816 A | 8/1988 | Rhodes | | |
| 4,919,078 A | 4/1990 | Morrison | | |
| 4,960,257 A * | 10/1990 | Waters | ................ | 248/442.2 |
| D319,472 S * | 8/1991 | Clyburn | ................ | D19/92 |
| 5,220,886 A | 6/1993 | Hyde | | |
| 5,261,350 A | 11/1993 | Vavrek | | |
| 5,329,878 A | 7/1994 | McCauley | | |
| D354,520 S * | 1/1995 | Pong | ................ | D19/88 |
| 5,572,950 A | 11/1996 | O'Rourke et al. | | |
| 5,575,238 A | 11/1996 | Redman | | |
| 5,623,892 A | 4/1997 | O'Rourke et al. | | |
| D384,655 S * | 10/1997 | Knoop | ................ | D19/91 |
| 5,713,302 A | 2/1998 | Walter | | |
| 5,768,827 A * | 6/1998 | Hackett | ................ | 49/57 |
| 5,809,933 A * | 9/1998 | Conwell, III | ................ | 119/28.5 |
| D399,613 S | 10/1998 | O'Rourke et al. | | |
| 5,842,438 A | 12/1998 | Messmer | | |
| 5,868,373 A * | 2/1999 | Duff | ................ | 248/459 |
| 5,924,383 A | 7/1999 | Smith | | |
| 5,970,914 A | 10/1999 | Steil | | |
| 5,975,017 A | 11/1999 | Cameron | | |
| 5,992,350 A | 11/1999 | Manzo | | |
| D425,566 S * | 5/2000 | Mueller et al. | ................ | D20/43 |
| 6,109,212 A | 8/2000 | Schacherbauer | | |
| 6,298,808 B1 | 10/2001 | Crafton et al. | | |
| 6,354,243 B1 * | 3/2002 | Lewis et al. | ................ | 119/165 |
| 6,367,420 B1 | 4/2002 | Tomlinson | | |
| 6,484,429 B1 * | 11/2002 | Przylucki | ................ | 40/661.08 |
| 6,951,190 B2 | 10/2005 | Northrop et al. | | |

(Continued)

*Primary Examiner* — Yvonne R. Abbott
(74) *Attorney, Agent, or Firm* — Carter, Schnedler & Warnock, P.A.

(57) ABSTRACT

A litter box safety guard attached or attachable to a litter box cover of the type having a generally vertical wall and an access opening in the wall, the access opening having a lower opening edge. The safety guard includes a generally vertical planar barrier at least as large as the access opening. The barrier is mountable directly in front of the access opening generally parallel to and spaced from the vertical wall a distance so as to allow entry and exit by cats around the barrier and through the access opening, while blocking access by larger dogs and children.

13 Claims, 3 Drawing Sheets

U.S. PATENT DOCUMENTS

| | | |
|---|---|---|
| 6,994,054 B2 | 2/2006 | Matsuo et al. |
| 7,011,042 B2 | 3/2006 | Martello et al. |
| 7,017,519 B1 | 3/2006 | Deasy et al. |
| 7,107,933 B2 | 9/2006 | Mohr |
| D581,681 S * | 12/2008 | Goolrick .................. D6/314 |
| 7,530,331 B1 * | 5/2009 | Malachowski ................ 119/484 |
| D595,782 S * | 7/2009 | Whitfield ...................... D20/43 |
| 2007/0283898 A1 * | 12/2007 | Madison ...................... 119/496 |
| 2009/0212593 A1 * | 8/2009 | Larson ......................... 296/158 |

\* cited by examiner

US 7,913,649 B2

LITTER BOX SAFETY GUARD

CROSS-REFERENCE TO RELATED APPLICATIONS

This is a continuation-in-part of U.S. patent application Ser. No. 11/327,186, filed Jan. 7, 2006 now abandoned, the entire disclosure of which is hereby expressly incorporated by reference. The benefit of U.S. provisional application Ser. No. 60/642,258 filed Jan. 8, 2005 is claimed.

BACKGROUND OF THE INVENTION

The invention relates generally to animal (in particular cat) litter boxes and, more particularly, to cat litter box covers.

It is known that silica components of clay litter (e.g., cat litter) can cause serious illnesses if ingested or inhaled. Silica is considered toxic by the Environmental Protection Agency (EPA) and is listed as a carcinogen by the California Environmental Protection Agency (Cal/EPA). Certain recent cat litter formulations (referred to as crystal cat litter) comprise silica as the primary component. In addition to the use of toxic silica, potentially dangerous chemicals may be added to the litter to retard dust and mask odors.

Silicosis (a condition resulting from the ingestion or inhalation of silica) symptoms can develop within weeks of silica exposure. In other cases the symptoms do not immediately present, but instead develop gradually over a period of several years of relatively consistent silica exposure.

Clumping day litter is especially convenient for the cat owner, as the clumped litter is easier to scoop than loose granular litter, simplifying the daily litter box cleaning task. But ingestion of sodium bentonite, a litter additive that solidifies liquid wastes, reportedly can cause serious or fatal health problems in dogs and humans. Ingested sodium bentonite absorbs liquids in the gut, solidifying digested food and blocking the digestive tract. Even if complete blockage does not occur, the sodium bentonite reduces the ability of the digestive tract to absorb minerals and nutrients from food. These impairments may lead to dehydration and compromise the immune system. Chronic ingestion of cat litter containing sodium bentonite also appears to be associated with hypokalemia, lethargy and muscle weakness, heart murmurs and macrocytic hypochromic anemia.

Additionally, bentonite ingestion can cause numerous food and skin allergies, coughing, vomiting, weight loss, constipation, intestinal blockages, bacterial infections, severe sneezing episodes, runny nose, choking, enlarged colon, kidney problems, renal failure, abdominal pain and even death.

Apart from the toxic substances in the litter, the bacterial count in soiled cat litter can be so high that it alone can cause numerous health problems if ingested. Poisoning due to cat litter ingestion has been reported in humans, especially children.

Small children, who have a propensity to place non-eatable objects into the mouth, can suffer serious health ailments from the ingestion of cat litter. Other animals (e.g., dogs) with access to a litter box are also likely to ingest the litter and suffer adverse health effects as described above.

Unfortunately, veterinarians may not associate the numerous health problems of their patient dogs with the ingestion of cat litter. Veterinarian visits and diagnosis and treatment charges increase as the pet owner searches for an answer and a cure to the mysterious illnesses that occur in an otherwise healthy pet who has ingested cat litter.

Cat litter typically is contained within a pan or box, which may also have a litter box cover. A cat litter box and mating cover are typically sold as a unit. The cover is easily removed for cleaning and replacement of the litter within the pan or box. The cover confines the litter spillage when the cat uses the litter box and may reduce litter odor in the surrounding area. The cover also keeps the soiled cat litter out of sight. A typical litter box cover fits over the litter box and defines a front opening through which the cat enters to access the litter box. Unfortunately, the opening also permits dogs and children to access the cat litter.

Since the cover encloses the cat litter, it may offer the pet owner a false sense of security. A dog or a young child can easily gain access to the box interior where he/she will be exposed to harmful bacteria and chemicals of the litter material. The child (or another pet) can reach into or crawl into the box through the front opening.

It is known that after using the litter box, the cat tends to scatter the litter stuck to its paws as it exits the litter box cover.

SUMMARY OF THE INVENTION

In one aspect, a safety guard is provided for attachment to a litter box cover of the type having a generally vertical wall and an access opening in the wall, the access opening having a lower opening edge. The safety guard includes a generally vertical planar barrier at least as large as the access opening. The barrier is mountable directly in front of the access opening generally parallel to and spaced from the generally vertical wall a distance so as to allow entry and exit by cats around the barrier and through the access opening, while blocking access by larger dogs and children.

In another aspect, a combination is provided including a litter box, a litter box cover, and a safety guard. The litter box cover has a generally vertical wall and an access opening in the wall. The access opening has a lower opening edge. The safety guard includes a generally vertical planar barrier at least as large as the access opening. The barrier is mountable directly in front of the access opening generally parallel to and spaced from the generally vertical wall a distance so as to allow entry and exit by cats around the barrier and through the access opening, while blocking access by larger dogs and children.

DETAILED DESCRIPTION

The invention is embodied in a litter box safety guard that limits litter box access by children and pets, thereby reducing health problems caused by litter exposure. Use of a litter box safety guard in combination with a litter box cover can prevent the tragic illnesses and needless suffering of animals and children by preventing access to the litter box. Some embodiments of the invention include litter releasing material for removing litter that adheres to the cat's paws as it exits the litter box, thereby reducing the need to clean litter tracked from the box.

The invention is embodied in an attractive and practical cat litter box safety guard which, in combination with a litter box cover, takes up no more space than a conventional litter box cover in use (since a litter box cannot be placed with its opening against the wall of a room and still expect a cat to enter), but prevents dogs and young children from exposure to the toxic substances and bacteria in cat litter.

Figure 1:
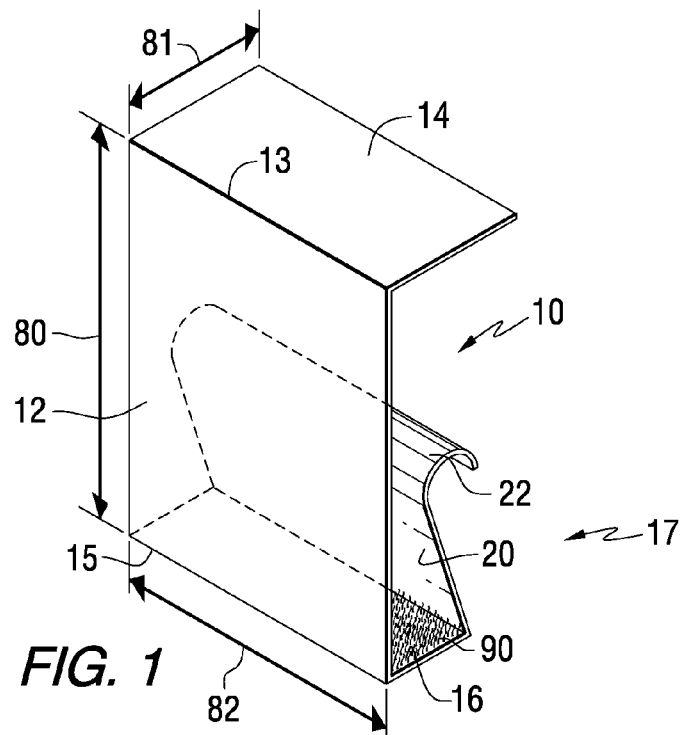
FIG. 1 is a three-dimensional view of a litter box safety guard embodying the invention in isolation.
Figure 2:
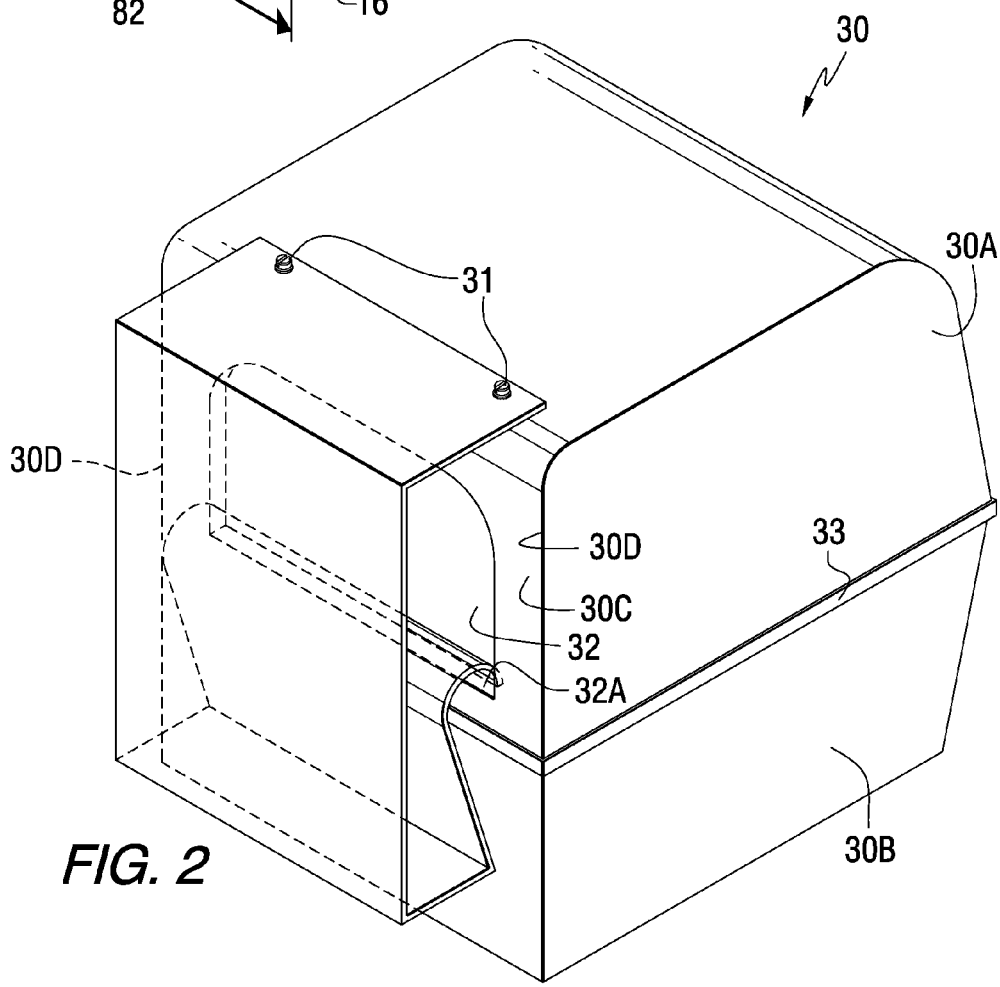
FIG. 2 is a three-dimensional view showing the safety guard of FIG. 1 attached to a cat litter box cover.

Referring now to FIGS. 1 and 2, a first litter box safety guard embodiment 10 is attached or attachable to a conventional litter box cover 30A positioned over a cat litter box 30B. In FIG. 2, the combination of the cat litter box 30B, the litter box cover 30A and the safety guard 10 is designated 30. The litter box cover 30A has a generally vertical front wall 30C, as well as an access opening 32 in the wall 30C. The access opening 32 has a lower edge 32A which is part of the cover 30A. Thus the access opening 32 is formed entirely in the cover 30A. In FIG. 2, the litter box 30B and cover 30A as illustrated have relatively sharp 90° corner transitions. For a better appearance, the corners may be rounded.

The litter box safety guard 10 more particularly includes a generally vertical planar barrier 12 at least as large as the access opening 32. The barrier 12 is mountable or mounted directly in front of the access opening 32 generally parallel to and spaced from the generally vertical front wall 30C a distance so as to allow entry and exit by cats around the barrier 12, and through the access opening 32, while blocking access by larger dogs and children. The size and position of the barrier 12 prevent direct frontal access to any part of the access opening 32.

The barrier 12 has an upper edge 13, and an upper support 14 extends from the upper edge 13 towards the litter box cover 30A for attachment to the litter box cover 30A. The barrier 12 also has a lower edge 15. A lower support, generally designated 17, extends from the lower edge 15 toward the litter box cover 30A.

The lower support 17 more particularly includes a horizontal surface portion 16 on which a cat can walk, a support panel 20 extending generally upwardly from the horizontal surface portion 16, and a support rail 22 at the upper edge of the support panel 20. In the illustrated embodiment, the support rail 22 is of inverted "J" configuration in cross section, for hooking over the lower edge 32A of the access opening 32. Alternatively, an inverted "U" or an inverted "L" configuration may be employed for the support rail 22. The support rail 22 may be affixed to the lower edge 32A of the access opening employing fasteners (not shown), adhesive (not shown), or by being integrally molded.

The upper support 14 is affixed to the litter box cover 30A, as illustrated in FIG. 2, using any known fastening components and materials, illustrated generally by fasteners 31, for example. By way of example, and not limitation, adhesive, hook and loop fasteners, bolts and mating nuts and screws may be employed. The upper support 14 may also be formed as a unitary structure with the litter box cover 30A.

The support rail 22, when attached to or supported by the lower edge 32A of the opening 32, supports the safety guard 10 against the weight of a cat entering and exiting the litter box 30B through the opening 32, in particular as the cat steps on the horizontal surface portion 16.

In the illustrated embodiment, the horizontal surface portion 16 comprises a litter releasing surface. More particularly, and with reference to FIG. 1, a litter-releasing material 90 for releasing the cat litter from the cat's paws as the cat exits the litter box 30B (FIG. 2) is disposed on or affixed to the horizontal surface portion 16. Outdoor artificial turf and rubber mat material comprising vertical nubs extending upwardly from a substrate are examples of suitable material. The litter-releasing material 90 can be affixed to the horizontal surface portion 16 of the lower support using a hook and loop fastener for easy removal, cleaning and replacement.

In the configuration illustrated in FIG. 2, the litter box cover 30A can be removed from the litter box 30 (for cleaning, for example) without removal of the safety guard 10. When the cover 30A and litter box 30B are separated (along a line 33 in FIG. 2), the safety guard 10 is carried by the cover 30A.

Figure 3:
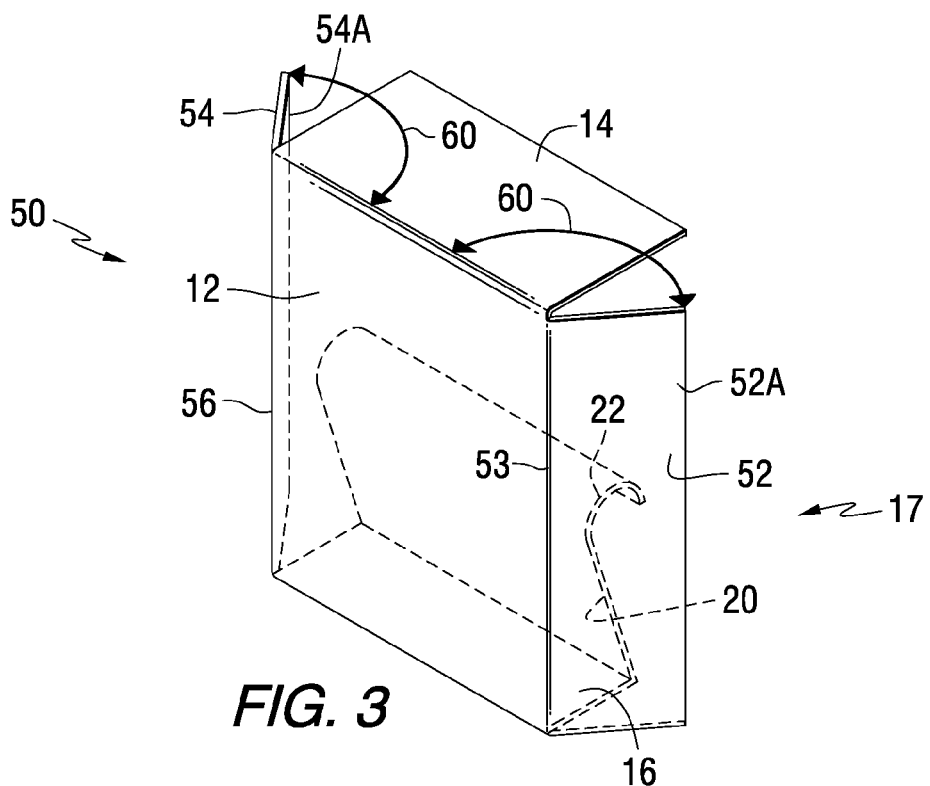
FIG. 3 is a three-dimensional view similar to that of FIG. 1, showing another litter box safety guard embodying the invention in isolation.

With reference to FIG. 3, another litter box safety guard embodiment 50 includes a pair of wings 52 and 54 attached to vertical side edges 53 and 55 of the barrier 12, as an additional barrier. The wings 52 and 54 thus are in addition to the barrier 12; the upper support 14; and the lower support 17 with its horizontal surface portion 16, support panel 20 and support rail 22; all as described hereinabove with reference to the safety guard 10 of FIGS. 1 and 2. The litter box safety guard 50 of FIG. 3 is attached or attachable to the litter box cover 30A in the same manner as is the safety guard 10. In FIG. 3, the wings 52 and 54 extend both laterally from the barrier 12 and towards the litter box cover 30A so that each forms an angle 60 with the barrier 12. The wings 52 and 54 thus provide an additional barrier for a dog or child to overcome when attempting to enter the litter box 30B through the opening 32 in the cover 30A. However, the more agile cat can easily enter the litter box 30B around the safety guard 50.

Although in FIG. 3 the transition between the barrier 12 and the wings 52 and 54 is shown as a sharp angle, the transition can be more rounded, to visually match rounded corner transitions of the litter box 30B and cover 30A as described hereinabove with reference to FIG. 2.

Figure 4:
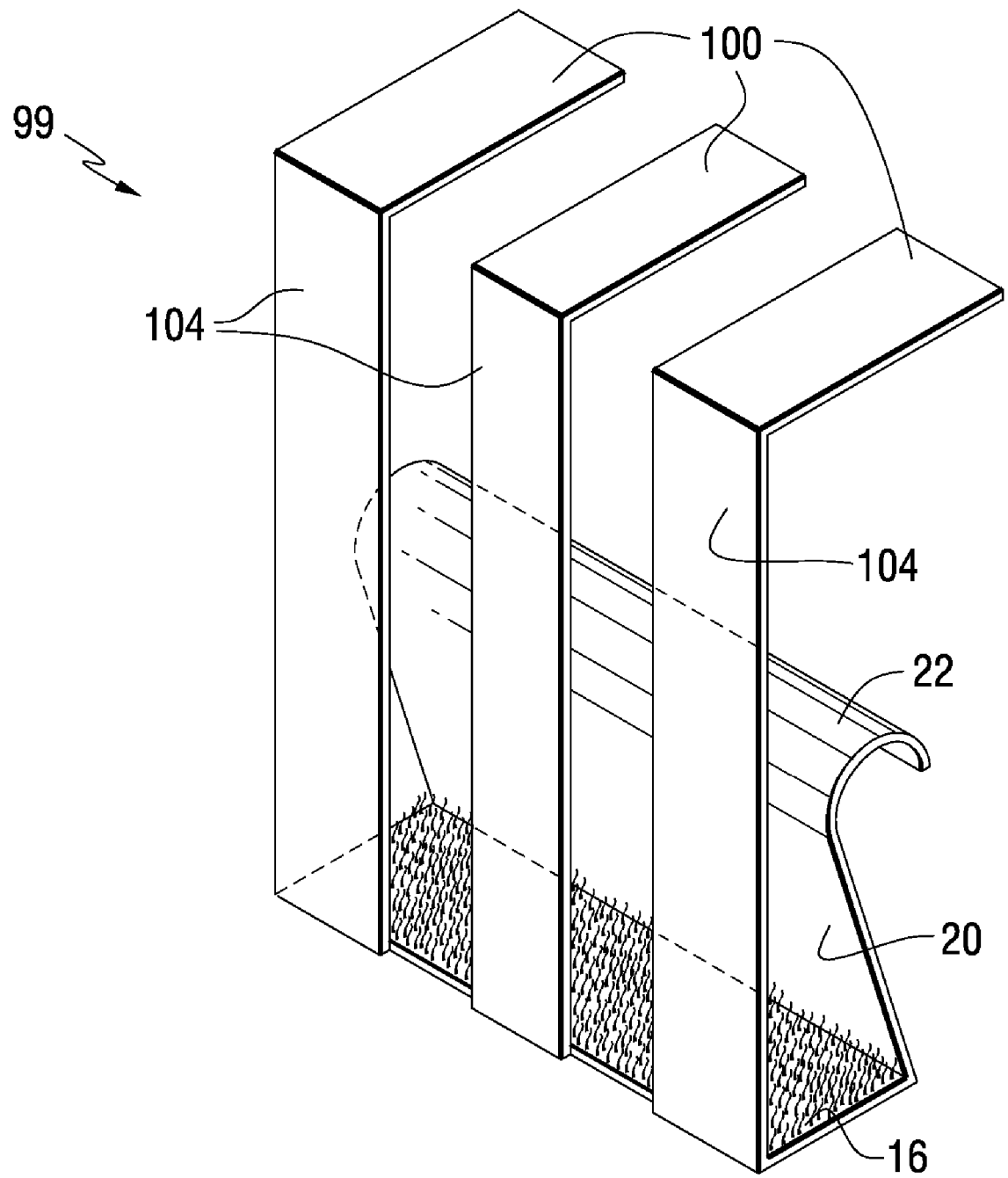
FIG. 4 is a three-dimensional view similar to that of FIG. 1, showing yet another litter box safety guard embodying the invention.

With reference to FIG. 4, yet another litter box safety guard embodiment 99 is shown, in which the planar barrier and upper support take the form of elongated structural members. In the example of FIG. 4, an upper support comprises a plurality of elongated members 100 extending from a generally vertical planar barrier comprising a plurality of elongated members 104. The members 100 and 104 are appropriately spaced and sized to provide the barrier functionality for the safety guard 99 as described hereinabove, while providing sufficient support for affixing the guard 99 to the litter box cover 30A. Although not illustrated, one or more of the horizontal surface portion 16 and the support panel 20 may also comprise a plurality of elongated members.

Figure 5:
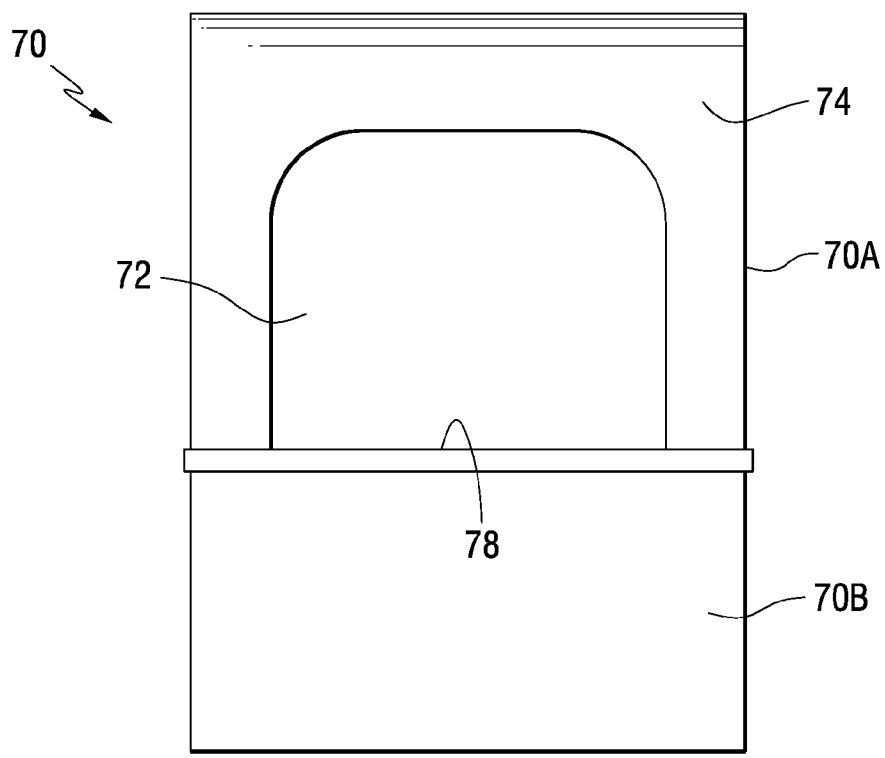
FIG. 5 is a front elevational view of another form of litter box and cover to which a safety guard may be attached.

Referring finally to FIG. 5, illustrated is another litter box and cover assembly 70 with which any one of the safety guards 10, 50 or 99 may be employed. The assembly 70 includes a litter box cover 70A positioned over a litter box 70B, with an access opening 72 in a generally vertical front wall 74 of the cover 70A. The assembly 70 of FIG. 5 differs from the cover 30A and litter box 30B of FIG. 2 in that the lower edge of the opening 72 is defined by an upper edge 78 of the litter box 70B. When any one of the safety guards 10, 50 or 99 of FIGS. 1, 3 and 4 is employed in combination with the assembly 70 of FIG. 5, the support rail 22 of inverted "J" configuration hooks over the lower opening 72 edge defined by the upper edge 78 of the litter box 70B to provide support. Since the support rail 22 is not actually attached, there is no interference when the cover 70A is removed from the litter box 70B. The safety guard 10, 50 or 99 remains affixed to the cover 70A.

When any of the litter box safety guard embodiments 10, 50 or 99 is employed, access by dogs and small children to the litter box within the litter box 30B is prevented. Small children and dogs cannot reach their heads or arms into the litter box 30B.

Since the safety guard 10, 50 or 99 extends forward of the generally vertical front wall 30C (FIG. 2) of the litter box cover 30A, the cat is provided with added privacy when using the litter box 30B without requiring additional floor space.

The safety guards 10, 50 and 99 embodying the invention can take the form of an after-market product to be installed on the cat litter box cover 30A by a pet owner. Alternatively, the safety guard 10, 50 or 99 may be permanently attached to the litter box cover 30A during manufacture of the litter box cover 30A and sold as the combination 30 including the litter box 30B, the cover 30A and the safety guard 10. As yet another alternative, the combination 30 including the litter box 30B, the cover 30A and the safety guard 10 can be designed as a unit and sold together in disassembled form.

The litter box safety guard 10, 50 or 99 may be made of an acrylic plastic (including clear, colored or tinted acrylic material) and measures approximately 14 inches to 16 inches high, 3 inches to 5 inches long and 9 inches to 12 inches wide (respective dimensions 80, 81 and 82 in FIG. 1). A transparent material may be especially beneficial as the material tends to confuse a young child in that the child tends to reach through the transparent material instead of around it. Other suitable materials include carbon-fiber, fiberglass, Lexan® polycarbonate resin (a registered trademark of the General Electric Company), rubber, metal or any of various plastic materials, including a plastic material from which the litter box 30B and/or the litter box cover 30A is manufactured. The litter box safety guard may be made by heating and bending a thermoplastic material, by injection molding, or any other process consistent with the particular material employed.

When the FIG. 1 guard 10 is installed on the litter box cover 30A, the distance from the barrier 12 to the access opening 32 is about five inches. When the FIG. 3 guard 50 including the wings 52 and 54 is installed, respective edges 52A and 54A of the wings 52 and 54 are about 3½ to about 4 inches from vertical edges 30D of the cover 30A of FIG. 2. Preferably the dimensions of the safety guard 10, 50 or 99 are dependent on the dimensions of the litter box cover 30A to which it is attached, as well as on the dimensions of the litter box 30B.

It will be appreciated that embodiments of the invention provide a unique, inexpensive, attractive and practical cat litter box cover attachment that takes up no more space than the litter box itself and prevents dogs and young children from accessing the toxic substances contained within the litter box. Advantages of the litter box safety guard include its practicality, durability, convenience and ease of use. It is lightweight, relatively inexpensive, and easy to attach to the litter box cover. In one embodiment the litter box safety guard is molded directly onto the litter box cover at the point of manufacture. With the litter box safety guard installed on a cat litter box cover, the upper and lower cover portions can be easily removed for cleaning the litter box. The extended front section of the safety guard also provides the cat with added privacy and protection from an assertive dog when using the litter box, without requiring additional space for placement of the litter box itself. (No additional floor space is required, because the additional air space occupied by the projecting safety guard 10, 50 or 99 is required in any event for a cat to enter the opening 32. Even without the projecting safety guard 10, 50 or 99, the front wall 30C of the cover 30A cannot be placed against the wall of a room and expect the cat to somehow enter the litter box 30B.

While the invention has been described with reference to various embodiments, it will be understood by those skilled in the art that various changes may be made and equivalent elements may be substituted for elements thereof without departing from the scope of the present invention. The scope of the present invention further includes any combination of the elements from the various embodiments as set forth herein. In addition, modifications may be made to adapt the teachings of the present invention to a particular application or to a specific litter box cover without departing from its essential scope. Therefore, it is intended that the invention not be limited to the particular embodiments disclosed, but that the invention include all embodiments falling within the scope of the appended claims.

What is claimed is:

1. A safety guard for attachment to a litter box cover of the type having a generally vertical wall and an access opening in the wall, the access opening having a lower opening edge, said safety guard comprising:

a generally vertical planar barrier at least as large as the access opening, said barrier mountable directly in front of the access opening generally parallel to and spaced from the generally vertical wall a distance so as to allow entry and exit by cats around said barrier and through the access opening, while blocking access by larger dogs and children, said barrier having a lower edge; and a lower support extending from said lower edge of said barrier towards the litter box cover;

said lower support including a horizontal surface portion on which a cat can walk, said horizontal surface portion comprising a litter releasing surface.

2. The safety guard of claim 1, wherein:

said barrier has an upper edge; and which further comprises an upper support extending from said upper edge of said barrier towards the litter box cover for attachment to said litter box cover.

3. The safety guard of claim 1, which further comprises a pair of wings attached to vertical side edges of said barrier as an additional barrier, said wings extending both laterally from said barrier and towards the litter box cover so as to form respective angles with said barrier, said wings allowing entry and exit by cats around said additional barrier and through the access opening.

4. The safety guard of claim 1, which is made of transparent material, carbon-fiber, acrylic, fiberglass, a polycarbonate resin, rubber, metal, or plastic materials.

5. A safety guard for attachment to a litter box cover of the type having a generally vertical wall and an access opening in the wall, the access opening having a lower opening edge, said safety guard comprising:

a generally vertical planar barrier at least as large as the access opening, said barrier mountable directly in front of the access opening generally parallel to and spaced from the generally vertical wall a distance so as to allow entry and exit by cats around said barrier and through the access opening, while blocking access by larger dogs and children, said barrier having a lower edge;

a lower support extending from said lower edge of said barrier towards the litter box cover, said lower support including a horizontal surface portion on which a cat can walk; and a litter releasing material affixed to said horizontal surface portion.

6. The safety guard of claim 5 wherein said litter releasing material comprises artificial turf or a rubber mat material.

7. The safety guard of claim 5, wherein:
said barrier has an upper edge; and which further comprises
an upper support extending from said upper edge of said barrier towards the litter box cover for attachment to said litter box cover.

8. The safety guard of claim 7, wherein said litter releasing material comprises artificial turf or a rubber mat material having vertical nubs extending upwardly from a base.

9. In combination:
a litter box;
a litter box cover having a generally vertical wall and an access opening in said wall, said access opening having a lower opening edge;
a safety guard comprising a generally vertical planar barrier at least as large as said access opening, said barrier mountable directly in front of said access opening generally parallel to and spaced from said generally vertical wall a distance so as to allow entry and exit by cats around said barrier and through said access opening, while blocking access by larger dogs and children.

10. The combination of claim 9, wherein said access opening is formed entirely in said cover such that said lower opening edge is a part of said cover.

11. The combination of claim 9, wherein said lower opening edge comprises an upper edge of said litter box.

12. The combination of claim 10, wherein:
said barrier has an upper edge and a lower edge; and which further comprises
an upper support extending from said upper edge of said barrier towards the litter box cover for attachment to said litter box cover; and
a lower support extending from said lower edge of said barrier towards the litter box cover;
said lower support including
a horizontal surface portion on which a cat can walk, and
a support rail for engagement with said lower opening edge to provide support.

13. The combination of claim 11, wherein:
said barrier has an upper edge and a lower edge; and which further comprises
an upper support extending from said upper edge of said barrier towards the litter box cover for attachment to said litter box cover; and
a lower support extending from said lower edge of said barrier towards the litter box cover;
said lower support including
a horizontal surface portion on which a cat can walk, and
a support rail for engagement with said lower opening edge to provide support.

* * * * *